United States Patent [19]

Hassib et al.

[11] 4,385,236
[45] May 24, 1983

[54] PASSIVE DOSIMETER FOR DETECTION OF RADON, THORON AND DAUGHTERS THEREOF

[75] Inventors: Gabor Hassib; Ernst Piesch, both of Leopoldshafen, Fed. Rep. of Germany

[73] Assignee: Kernforschungszentrum Karlsruhe, Karlsruhe, Fed. Rep. of Germany

[21] Appl. No.: 164,558

[22] Filed: Jun. 30, 1980

[30] Foreign Application Priority Data

Jun. 30, 1979 [DE] Fed. Rep. of Germany ....... 2926491

[51] Int. Cl.³ .................................................. G01T 1/04
[52] U.S. Cl. ............................... 250/472.1; 250/473.1
[58] Field of Search ........................ 250/253, 472, 473

[56] References Cited

U.S. PATENT DOCUMENTS 3,614,421 10/1971 Alter et al. ...................... 250/472 X
3,665,194 5/1972 Alter et al. ...................... 250/472 X
3,922,555 11/1975 Chapuis et al. ...................... 250/472

OTHER PUBLICATIONS

Hassib et al., a Low-Background Electrochemical Track Etch Detector as a Passive Dosimeter for Radon/Daughters, Nov. 1978.
Radon and Daughter Measurements with Active and Passive Devices Using Track Etch Detectors, Frank et al.
Comparison of Different Radon-Daughter Monitors, Haber et al.

Primary Examiner—Davis L. Willis
Attorney, Agent, or Firm—Spencer & Kaye

[57] ABSTRACT

In a passive dosimeter for the detection of radon and/or thoron and their daughters and including a diffusion chamber having two end faces, a first radioactive decay detector composed of a nuclear track detector foil or an integrating α-detector sealing one end face of the chamber, and a filter transmissive for radon and/or thoron, whereby the detector provides an indication of radon and thoron decay and the resultant daughters, there is further provided a second chamber corresponding in structure to the diffusion chamber and having two end faces, with one end face of the second chamber being sealed by the side of the filter directed away from the diffusion chamber, and a second radioactive decay detector substantially identical to the first detector sealing the other end face of the second chamber, with passages being provided between the second chamber and the environment of the dosimeter for passage of gas with radon and thoron and daughters to be measured into the second chamber. When the detector is a nuclear track detector foil, selected levels of the energy of α-particles impinging on the foil during exposure to such particles can be identified by first chemically pre-etching the foil for removing a layer of foil material to a depth corresponding to a selected α-particle energy level, and then performing an electrochemical etching operation on the foil for rendering the α-particle impingement tracks in the foil visible.

8 Claims, 5 Drawing Figures

PASSIVE DOSIMETER FOR DETECTION OF RADON, THORON AND DAUGHTERS THEREOF

BACKGROUND OF THE INVENTION

The present invention relates to a passive dosimeter for the detection of radon and/or thoron and their daughters, the dosimeter being of the type composed of a diffusion chamber having two end faces, one of which is sealed by a nuclear track detector foil or an integrating α-particle detector, and the other of which is sealed by a filter transmissive for radon and/or thoron, and by means of which the radon and thoron decay and the resultant daughters are determined.

The effect of radon/thoron and their daughters contributes substantially to natural radiation exposure. These α-radionuclides are present in the free atmosphere and enter the lungs after an α-decay as free ions and/or attached to aerosols. In correspondence with the radium and thorium content in the soil and in building materials, the average inhalation dose of the population due to radon and daughters amounts to 775 mrem/year, based on the entire lung. In closed dwellings, but above all, in mines, 10 to 100 times this lung exposure can occur under certain circumstances.

When measuring radon and daughters, one is confronted with the task of determining the radiation burden of, above all, the daughters, since the noble gas radon $^{222}$Rn remains in the lung only for a short period of time, whereas the shortlived daughters bound to aerosols are left in the bronchial cavity.

Tables 1 and 2 below set forth the decay series for radon and thoron.

TABLE 1

| Name | Isotope | Half-Life Value | Type of Radiation | $E_\alpha$ Mev |
|---|---|---|---|---|
| Radon | $^{222}Rn$ | 3.823 d | α | 5.49 |
| RaA | $^{218}Po$ | 3.05 min | α | 6.00 |
| RaB | $^{214}Pb$ | 26.8 min | β,γ | — |
| RaC | $^{214}Bi$ | 19.7 min | β,γ | — |
| RaC' | $^{214}Po$ | 164 μs | α | 7.69 |
| RaD | $^{210}Pb$ | 21 y | β,γ | — |

TABLE 2

| Name | Isotope | Half-Life Value | E Mev |
|---|---|---|---|
| Thoron | $^{220}Rn$ | 55.65 s | 6.29 |
| Th A | $^{216}Po$ | 0.15 s | 6.78 |
| Th B | $^{212}Pb$ | 10.6 h | — |
| Th C' | $^{212}Po$ | 0.3 μs | 8.78 |
| Th C'' | $^{208}Tl$ | 3.1 min | — |

Measurement of radon/thoron and daughters is effected according to the present state of the art primarily with battery-operated instruments which take in air via a filter and measure the daughters separated on the filter. In this connection, three methods are utilized essentially, wherein a specific amount of air is pumped through a filter, as described in IAEA Safety Series No. 43, "Manual on Radiological Safety in Uranium and Thorium Mines and Mills":

1. Kusnetz Method

After an air throughput of 10 liters (about 5 minutes of pumping time), radon daughters are collected on the filter and, after a waiting period of 40-90 minutes, the α-activity is measured. With the aid of the Kusnetz correction curve, the potential α-energy of the radionuclides is determined in units of WL (Working Level).

2. Instant Working Level Meter

In this case, the α/β-activity measurement of the filter takes place immediately after sampling and/or after an air throughput of about 5 liters.

3. Measurement of α-Energy Concentration

After a short-term or long-term deposition of the daughters on a filter, the short-lived α-particle radiators RaA and RaC' are here detected separately by α-spectroscopy and, after a measuring period of about 2 hours after sampling, directly indicated as α-energy concentration. Such a method is described in detail by B. Haider and W. Jacobi in Forschungsbericht [Research Report] K 72-14, Kernforschung [Nuclear Research], entitled Entwicklung von Verfahren und Geräten zur langzeitigen Radon-Überwachung in Bergbau [Development of Methods and Apparatus for Long-Term Radon Monitoring in Mines], published by the Bundesministerium für Bildung und Wissenschaft [Federal Ministry for Education and Science] of the Federal Republic of Germany in August, 1972, under publication number BMBW-FB K 72-14.

The construction of correspondingly long-term-integrating radon dosimeters is substantially restricted to two versions. The active radon dosimeter pumps air through a filter and measures particularly the α-particles of the decay products with a thermoluminescence dosimeter [TLD] or a nuclear track detector. One disadvantage resides in that a TLD also detects the gamma background radiation, and dust particles are collected on the surface of the dosimeter, which can lead to erroneous measurement. This is described by J. Huber et al at pages 139-146 and by G. M. Hassib et al at pages 36-44 of the Proc. of NEA Specialist Meeting Radon Monitoring, Paris, Nov. 20-22, 1978, published by the Nuclear Energy Agency Organisation for Economic Co-operation and Development.

When using Kodak LR-115 cellulose nitrate films, it is possible to detect three different α-energy groups, namely RaA, RaC', and ThC', separately due to the high absorption of the α-particles in the nuclear track film behind covers of different thicknesses. In all these cases, however, a battery-operated instrument with a pump must be employed, as described by P. Duport et al in IAEA Symp. on Advances in Radiation Protection Monitoring, Stockholm, June 26-30, 1978, pp. 435-442.

A diffusion chamber described by Frank et al in Radon Workshop, Feb. 1977, HASL-325: 6-8, allows radon to enter into the measuring volume through a filter. After about 5 hours, an equilibrium occurs between radon and daughters in the measuring volume. This dosimeter measures essentially exclusively radon by way of the daughters, after an equilibrium has occurred between radon and daughters. However, of interest for radiation protection is the determination of lung exposure, above all, by daughters. In a dwelling or in a mine, no equilibrium is expected between radon and daughters due to ventilation of the room air and/or air conditioning of the mine tunnel. Accordingly, measurement of the radon concentration by way of the daughers in a diffusion chamber can lead, under unfavorable conditions, e.g. 10% equilibrium, to a corresponding overestimation of the lung exposure of up to a factor of 10.

SUMMARY OF THE INVENTION

It is an object of the present invention to provide a passive dosimeter which isolates the measuring effect of radon/thoron and detects exclusively radon/thoron daughters which, however, due to their varying $\alpha$-particle energy, provide a differing contribution toward the $\alpha$-particle energy concentration, which is, in particular, also the disadvantage of the conventional diffusion chamber where no differentiation is possible between RaA, RaC', and ThC'.

This and other objects are achieved, according to the invention, in a passive dosimeter for the detection of radon and/or thoron and their daughters and including means defining a diffusion chamber having two end faces, a first radioactive decay detector composed of a nuclear track detector foil or an integrating $\alpha$-detector sealing one end face of the chamber, and a filter transmissive for radon and/or thoron, whereby the detector provides an indication of radon and thoron decay and the resultant daughters, by the provision of: means defining a second chamber corresponding in structure to the diffusion chamber and having two end faces, with one of the end faces of the second chamber being sealed by the side of the filter directed away from the diffusion chamber; a second radioactive decay detector substantially identical to the first detector sealing the other end face of the second chamber; and means defining passages between the second chamber and the environment of the dosimeter for passage of gas with radon and thoron and daughters to be measured into the second chamber.

In contrast to conventional dosimeters, the passive radon/thoron dosimeter according to this invention operates without a pump, wherein a nuclear track detector or an integrating $\alpha$-particle detector operable over a long term of 1 week to 3 months records $\alpha$-particles of $^{220}$Rn/$^{222}$Rn and their daughters from a definite air volume. In contrast to the active dosimeters operating in the presence of gas throughflow, the passive dosimeter according to the invention thus detects, in addition to the daughters, also $\alpha$-particles of $^{222}$Rn and/or $^{220}$Rn, reaching the detector from the given, identical volumes of the measuring chambers having structures of identical geometry. The effective volume from which the $\alpha$-particles are detected is determined by the range of the $\alpha$-particles in air and/or by the detector characteristic.

The previously utilized method of separating various $\alpha$-particle energy groups is based on the empirical finding that the depth of $\alpha$-particles in a nuclear track detector foil, for example in "Makrofol" polycarbonate, is determined by the $\alpha$-particle energy. With a conventional etching of the Kodak LR-115 detector, etching groups and/or nuclear tracks are visible if the thin, red-colored detector layer is etched through, so that in a microscopic evaluation bright holes appear on a red background. Therefore, to effect absorption of the $\alpha$-particles and discrimination among various $\alpha$-particle energy groups, the detector foil is conventionally covered with synthetic resin films of different thicknesses.

This method is not optimal, so that the invention additionally provides a method for identifying selected levels of the energy of $\alpha$-particles impinging on a nuclear track detector foil which has been exposed to such particles in a dosimeter, which is performed by first chemically pre-etching the foil for removing a layer of foil material to a depth corresponding to a selected $\alpha$-particle energy level, and then performing an electrochemical etching operation on the foil for rendering the $\alpha$-particle impingement tracks in the foil visible. Preferably, this method is carried out in apparatus which includes a housing provided with a plurality of parallel bores defining etching chambers for receiving pre-etching fluid, and means including a closure cap for supporting the foil against the housing in communication with the bores for enabling the step of chemically pre-etching to be performed individually on selected regions of the foil.

This method and apparatus thus make it possible to effect a chemical pre-etching of the detector foil, wherein a considerable part of the layer thickness corresponding to the $\alpha$-particle range is removed before the actual etching step to make the nuclear tracks produced by radon, and/or thoron and their daughters visible. Such tracks become observable only upon such subsequent, electrochemical etching procedure.

DESCRIPTION OF THE PREFERRED EMBODIMENTS

Figure 1:
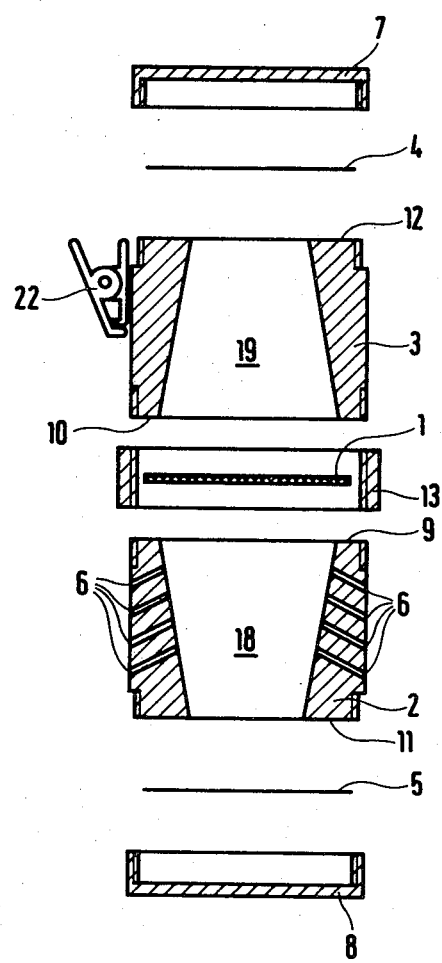
FIG. 1 is a cross-sectional elevational exploded view of a preferred embodiment of a dosimeter according to the invention.

The passive dosimeter illustrated in FIG. 1 is composed of a housing 3 defining a diffusion chamber 19 and a housing 2 of identical construction defining a chamber 18 which is laterally open, via passages 6, allowing entrance of radon/thoron with the respective proportion of daughters.

Both housings 2 and 3 have a cylindrical exterior and are formed interiorly so that chambers 18 and 19 have the shape of truncated cones. The smaller diameter ends of the cone, the conic form being provided on account of radiation emanating from daughters deposited on the inside wall, face respective nuclear track detector foils 4 and 5 sealing off the two end faces 12 and 11 of housings 3 and 2, respectively, on one side. The foils 4 and 5 for instance a nuclear track detector like Makrofol E 300 $\mu$m or an integrating alpha-detector like thermoluminescence detectors are held in place by means of caps 7 and 8 which can be threadedly mounted to the housings 2 and 3 via corresponding threads.

The truncated-cone sides having the larger diameter face a common filter 1, wherein the end faces 9 and 10 of housings 2 and 3 rest on respective sides of filter 1. The filter 1 is of a material, such as glass fibers, which is transmissive only for radon/thoron but not for aerosols etc. Both housings 2 and 3 are pressed together by means of a screw closure 13, which is a ring with an internal thread, and corresponding outer threads in the zone of the end faces 9 and 10 of housings 2 and 3, with filter 1 interposed between housings 2 and 3.

The wall of the second housing 2 has bores or slots 6 inclined inwardly toward the surface of the filter 1. Gas containing radon/thoron and their daughters diffuses through such bores or slots into the chamber 18. The passive dosimeter 2, 3 can be provided with a clip 22, by means of which it can be attached to an article of clothing or the like.

Through the glass fiber filter 1, only radon/thoron then diffuses into the chamber 19, whereas the daughters present in the gas to be measured are deposited on the filter 1 and only on the inside of chamber 18. After a relatively long period of time, the radon/thoron, which has diffused into the chamber 19, will be in equilibrium with its newly produced daughters. The same equilibrium is also obtained in chamber 18 for the radon/thoron proportion. The detector foils 5 and 4 will, therefore, detect the following α-particles:

Chamber 18: Rn decay and resultant daughters and proportion of daughters in the air (gas).

Chamber 19: Rn decay and resultant daughters.

From the difference between the detector indications of foils 5 and 4, the proportion of daughters existing in the atmosphere can be determined separately from the radon influence. The Rn concentration results from the direct indication of foil 4. Thus, the measuring effect by Rn is suppressed, which does not occur in an active dosimeter. The conical internal shape of the chambers 18 and 19 reduces the effect of daughters deposited on the side walls to the same proportion in chambers 18 and 19. The conical shape of the chambers surves for a reduction of the detection efficiency of alpha-particles emitted from radon decay product collected on inner surfaces of the chambers.

Figure 2:
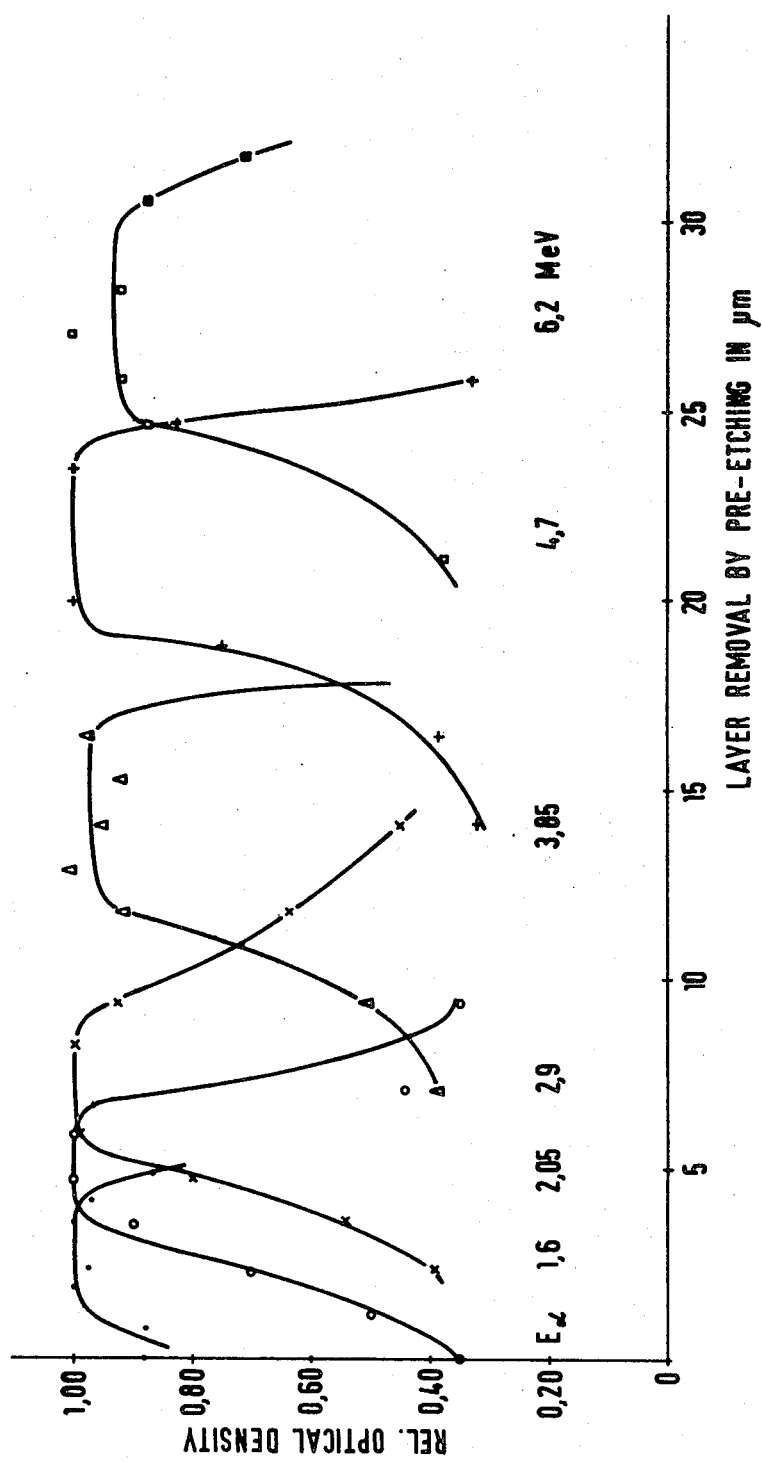
FIGS. 2 and 3 are diagrams illustrating the operation of embodiments of the invention.

FIG. 2 shows the relationships associated with the conventional evaluations of foils 4 and 5 as regards relative optical density, plotted versus layer removal by pre-etching in μm for various energy levels Eα in MeV before ECE, with a pre-etching with $C_2H_5OH$ and 6 N KOH in a volume ratio of 4:1, with bulk etching rate of 2.34 μm/h at room temperature, and an electrochemical after-etching (ECE) of for example, "Makrofol" E 300 μm foils after pre-etching has taken place. The after-etching is effected, for example, with 20% alcohol in 6 N KOH, an electrical voltage of 800 $V_{eff}$, a frequency of 2 kHz, at room temperature over a period of 4 hours.+

+ A set of six Makrofol E 300 μm foils was irradiated to the same dose of the indicated six different α-energies Eα. Each foil of the set was pre-etched for different periods resulting in the indicated change of layer-removal. After this pre-etching treatment the same ECE treatment was supplied. For each alpha energy a plateau was observed and the optimum pre-etching condition interpreted here as the maximum detection efficiency is equivalent to the layer in the middle of the plateau.

FIG. 3 again shows the depths of the α-particle tracks, proportional to the lengths of the arrows, in μm depending on the energies Eα in, for example, "Makrofol" E 300 μm. The arrows emanate from the surface of foils 4 and 5, respectively; the portion of the nuclear tracks visible after ECE is marked with crosses (frontal impingement of the particles).

The use of a conventional pre-etching step leads, in case of the invention, to a controlled removal of a surface layer. The etching period can be adapted to the corresponding α-particle energy and/or the corresponding α-particle radiator.

Several interesting relationships for daughters are represented in the following Table 3.

TABLE 3

| Isotopes | Detector Layer Removed in μ | Pre-Etching Time in Hours |
|---|---|---|
| Ra A | 8.4 | 3.56 |
| Ra C' | 15.0 | 6.36 |
| Th C' | 25 | 10.60 |

Figure 3:
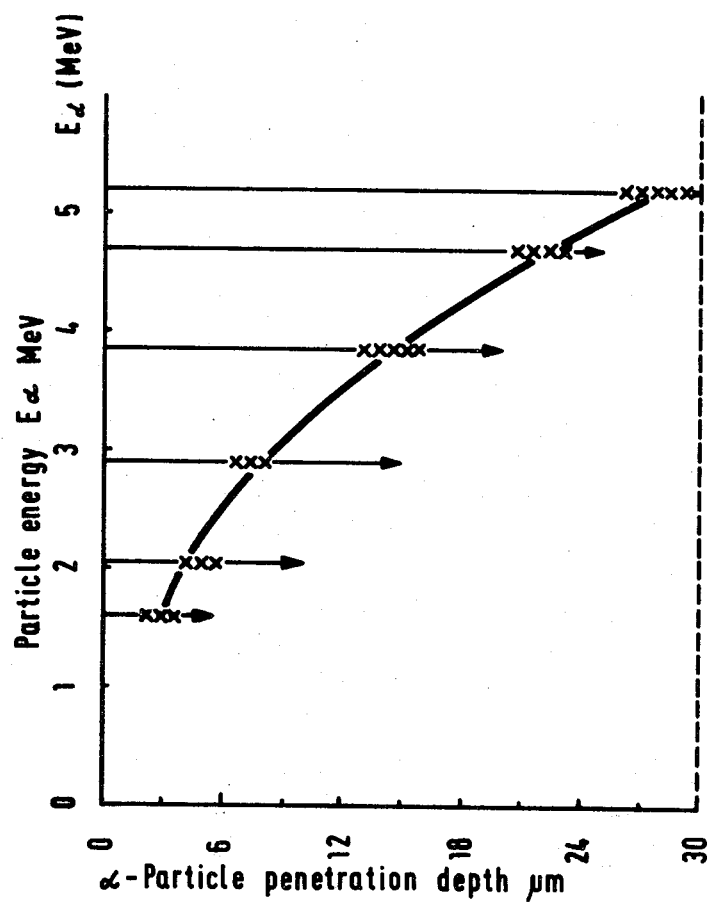
Figure 4:
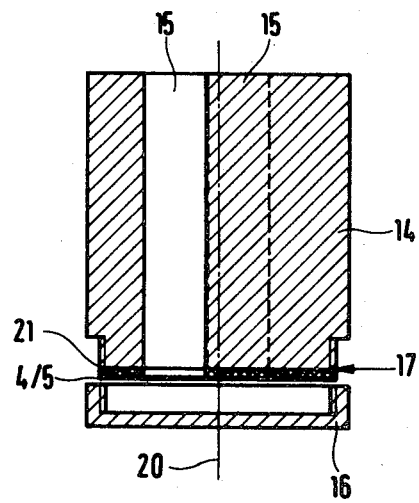
FIG. 4 is a cross-sectional, elevational view of a preferred embodiment of an etching unit according to the invention.
Figure 5:
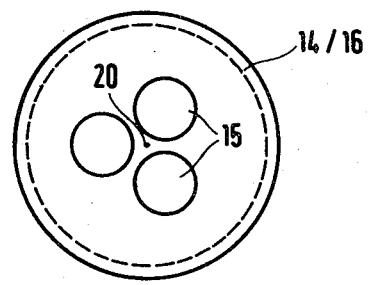
FIG. 5 is an axial end view of the embodiment of FIG. 4.

If, for example, only these three isotopes, or energy levels, are of interest, then a single, special etching chamber 14 can be utilized as illustrated in FIGS. 4 and 5, it being understood that the number or identity of the energy levels can be varied by varying the number of the bores 15. FIGS. 4 and 5 show, in a cross-sectional view, a cylindrical etching housing 14 with three bores 15 uniformly distributed about the longitudinal axis 20 of housing 14 and extending throughout the length thereof parallel to this axis. These bores define etching chambers which can be filled with pre-etching fluid in a manner to establish different etching times and/or in varying concentrations. Before pre-etching on the end face 17 of the etching housing 14, a foil 4 or 5, with the interposition of a seal 21, is brought by means of a screw-type closure cap 16 simultaneously into contact with all three bores 15. After closing the bores 15 i.e. the etching chamber, the etching fluids are filled therein. The number of simultaneously discriminable energy bands is in accordance with the number of bores 15. The pre-etching period is different for each bore 15 according to the optimal layer removal as shown in FIG. 3 but here only for three different alpha energy groups.

It will be understood that the above description of the present invention is susceptible to various modifications, changes and adaptations, and the same are intended to be comprehended within the meaning and range of equivalents of the appended claims.

What is claimed is:

1. In a passive dosimeter for the detection of at least one atomic species selected from the group consisting of radon and thoron and the daughters thereof and including means defining a diffusion chamber having two end faces, a first radioactive decay detector sealing one end face of the chamber, and a filter transmissive for the selected atomic species sealing the other end face of the chamber, whereby the detector provides an indication of radon and thoron decay and the resultant daughters, the improvement comprising: means defining a second chamber corresponding in structure to said diffusion chamber and having two end faces, with one of said end faces of said second chamber being sealed by the side of said filter directed away from said diffusion chamber; a second radioactive decay detector substantially identical to said first detector sealing the other end face of said second chamber; and means defining passages between said second chamber and the environment of said dosimeter for passage of gas with radon and thoron and daughters to be measured into said second chamber.

2. An arrangement as defined in claim 1 further comprising means firmly joining said two chambers together with said filter interposed therebetween, and two caps each attaching a respective one of said detectors to an associated end face of a respective one of said chambers.

3. An arrangement as defined in claim 2 wherein said joining means and said chambers are formed to provide a threaded connection between said joining means and each said chamber.

4. An arrangement as defined in claim 1, 2, or 3 wherein said passages are inclined toward said filter in the direction from the environment of said dosimeter to said second chamber.

5. An arrangement as defined in claim 1 wherein each said detector is composed of a nuclear track detector foil.

6. An arrangement as defined in claim 1 wherein each said detector is composed of an integrating α-detector.

7. A method for identifying selected levels of the energy of α-particles impinging on a nuclear track detector foil which has been exposed to such particles in a dosimeter, comprising: selecting a specific α-particle energy level having an associated depth of penetration into the foil; first chemically pre-etching the foil for removing a layer of foil material to a selected depth corresponding to the selected α-particle energy level; and then performing an electrochemical etching operation on the foil for rendering the α-particle impingement tracks in the foil visible.

8. Apparatus for performing a chemical pre-etching of a nuclear track detector foil which has been exposed to α-particles having a plurality of energy levels, comprising: a housing provided with a plurality of parallel bores defining individual etching chambers for receiving pre-etching fluid; and means including a closure cap for supporting the foil against said housing in such a manner that each chamber communicates with a respective selected region of the foil for enabling each selected foil region to be chemically pre-etched to a respective depth corresponding to a respective one of the plurality of energy levels.

* * * * *